Patented Nov. 20, 1928.

1,692,240

UNITED STATES PATENT OFFICE.

ARTHUR WHITE YOUNG AND MAURICE EMERSON LOUTH, OF KOKOMO, INDIANA, ASSIGNORS TO UDYLITE PROCESS COMPANY, OF KOKOMO, INDIANA, A CORPORATION OF INDIANA.

CADMIUM-PLATING BATH.

No Drawing. Application filed March 31, 1926. Serial No. 98,914.

This invention relates to cadmium plating baths; and it comprises a method of electrodepositing cadmium as coatings of desirable character wherein the coating bath receives an addition of a grain extract and/or sugar, either or both being often caramelized; and it further comprises as a new composition of matter a dry mixture containing salts adapted for cadmium plating and also containing the soluble matters of grain; all as more fully hereinafter set forth and as claimed.

In an electrodepositing bath cadmium is capable of giving coatings of ornamental appearance and of utility as a protection against corrosion. The cadmium is nearly always deposited from an alkaline bath containing cyanids. Baths of this type are described in our prior Patent 1,537,047, May 5, 1925. In using such a bath an addition agent is practically necessary to secure bright coatings of a desirable character; and a number of such agents have been proposed and used. Nothing is known as to the theory of the action of these addition agents in this bath and practice is entirely empirical. It is known that various different substances are useful in this bath and that their specific actions are different. Nothing is known as to why this is so.

In working with cadmium plating baths of the cyanid type we have used as addition agents, various extracts of cereal products and have obtained good results in securing bright, uniform and coherent cadmium deposits with their aid. A water extract of bran gives good results as does a similar extract made from wheat, corn, rye, barley, malt, etc. Commercial malt extract is also useful. Among the many other extractive bodies present in these grain extracts are various sugars; malt extract of course containing a considerable amount. But we have found that the addition to these extracts of a certain amount of sugary material of another character and from another source improves the results. Cane sugar itself is not so useful as the impure sugar solutions found in molasses and syrups. Sugars, molasses, etc. work better if they are caramelized by heat to a considerable extent prior to using. The effect of the conjoint use of a cereal extract and of sugar, particularly caramelized sugar, is more than additive; the effect of the mixture is more than the sum of the results of the several components. With bran and whole wheat extracts, the bright range in cadmium plating is from approximately 4 amperes per square foot up to 15. Sugar cane molasses or malt extract gives results perhaps a little higher. With either material, heating to produce caramelization improves the results. While these results are good they may be bettered and such a betterment is obtained by using both classes of materials together, as by using a mixture of caramelized syrup with the grain extract.

A material made by extracting bran and wheat in the proportion of 1 part bran and 4 parts wheat, with hot water and admixing with caramelized New Orleans molasses gives the best results we have as yet obtained. It produces a bright deposit in cadmium plating in the range between 3 amperes and 30 amperes per square foot; it is entirely water soluble and produces no precipitates or deposits when added to a cyanid bath. A water solution of a mixture of grain extract or of bran extract with caramelized molasses can be readily reduced to dryness, giving a non-hygroscopic composition which can be readily mixed with cadmium cyanid salts to form a dry composition which upon addition of water produces an effective cadmium plating bath.

In the cadmium plating bath an addition agent made as described is extremely permanent. Many addition agents in such a bath are exhausted and require replenishment within a short time. Baths supplied with addition agent under the present invention work efficiently over periods of many months without replenishment.

In a specific embodiment of our invention a dry mixture of salts ready to furnish, on addition of water, a bath useful under our invention, is made by mixing cadmium oxid, sodium cyanid and a dried extract of whole wheat and bran containing about 30 per cent of caramelized molasses; the mixture being in about the proportions of 1 part by weight of cadmium oxid, 5 parts of sodium cyanid and 0.07 parts of the extract. With 71 grams of cadmium oxid, 350 grams of commercial sodium cyanid and 5 grams of dried cereal extract, a mixture can be made which on solution in a gallon of water will make an efficient cadmium plating bath ready to operate at once. We find that the proportion of the cereal extract present in the bath may vary within rather wide limits. About 2 grams per gallon will give some action and as high as 30 grams per gallon can be used without detriment to the bath; but on the whole we find that the proportion indicated, about 5 grams per gallon, is best. With 5 grams (on a dry basis) of cereal extract per gallon, the bath will work efficiently for five or six months before replenishing addition agent is necessary. The gas developed at the cathode is much reduced in the presence of this addition agent and smoother deposits are produced. Unlike some other addition agents, the effect of the present addition agent is instantaneous on solution in the bath. No period of maturing or ripening is required prior to turning on the current.

While, as stated, we find it better to use a mixture of grain extract of some kind and caramelized molasses, either may be used alone with much of the results we are here seeking.

What we claim is:—

1. In the art of cadmium plating, the process which comprises electroplating cadmium from a cyanid bath in the presence of an addition agent comprising a cereal extract and caramelized sugar.

2. In the art of cadmium plating, the process which comprises electroplating cadmium from a cyanid bath in the presence of an addition agent comprising a cereal extract.

3. In the art of cadmium plating, the process which comprises electroplating cadmium from a cyanid bath in the presence of an addition agent comprising caramelized sugar.

4. In the art of cadmium plating, the process which comprises electroplating cadmium from a cyanid bath in the presence of an addition agent comprising an extract of bran, an extract of wheat and caramelized molasses.

5. As a new composition of matter, a dry mixture of a cadmium compound and of a cyanid adapted to make a cadmium plating bath therewith, with a cereal extract containing molasses.

In testimony whereof, we have hereunto affixed our signatures this 27 day of March, 1926.

ARTHUR WHITE YOUNG.
MAURICE EMERSON LOUTH.